United States Patent
Schermer et al.

(10) Patent No.: US 7,335,338 B2
(45) Date of Patent: *Feb. 26, 2008

(54) METHOD AND APPARATUS FOR AUTOMATIC PIN DETECTION IN MICROARRAY SPOTTING INSTRUMENTS

(75) Inventors: Mack J. Schermer, Belmont, MA (US); C. Brian Candiloro, Waltham, MA (US)

(73) Assignee: PerkinElmer LAS, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/103,162

(22) Filed: Apr. 11, 2005

(65) Prior Publication Data

US 2005/0181510 A1    Aug. 18, 2005

Related U.S. Application Data

(63) Continuation of application No. 09/527,892, filed on Mar. 20, 2000, now Pat. No. 6,878,554.

(51) Int. Cl.
B01L 3/02 (2006.01)

(52) U.S. Cl. .................. 422/100; 422/99; 436/180

(58) Field of Classification Search ............ 422/62, 422/67, 99, 100; 436/43, 49, 54, 180; 73/863, 73/863.01, 864, 864.01, 864.23, 863.31, 73/863.32
See application file for complete search history.

(56) References Cited

U.S. PATENT DOCUMENTS 4,817,443 A    4/1989  Champseix et al.

(Continued)

FOREIGN PATENT DOCUMENTS

EP    0 287 783    10/1988

(Continued)

OTHER PUBLICATIONS

GSI Lumonics ScanArray Technical Note 300: ScanArray Microarray Barcodes: Automated Microarray Analysis & Data Tracking, Jun. 1999.

(Continued)

*Primary Examiner*—Jill Warden
*Assistant Examiner*—Dwayne K Handy
(74) *Attorney, Agent, or Firm*—Wilmer Cutler Pickering Hale and Dorr LLP (57) ABSTRACT

A method and apparatus are provided for automatically sensing the presence (or absence) of spot dispensers such as pins in various possible mounting locations in the printhead of a microarray spotting instrument. Pin-location data obtained by the method and apparatus is provided to the computer controller of the instrument, which uses the data to control the motion of the printhead during operation of the instrument. A pin detection apparatus includes one or more sensor elements that automatically sense possible pin locations in the printhead for the presence of pins. The sensor elements are preferably arranged in an array corresponding to the array of pin locations in the printhead so that pin detection at each pin location can be performed simultaneously. Various types of sensor elements can be used to locate pins in a printhead. For example, sensors can be used that are remote from or attached to a printhead. Pin sensors can be used that sense pin locations from various positions relative to the printhead including above or below the printhead. Also, pin sensing can be by contact or non-contact mechanisms. The method and apparatus allow pin positions in a printhead to be quickly and accurately determined, and without significant risk of damaging the pins, which are fragile.

35 Claims, 7 Drawing Sheets

U.S. PATENT DOCUMENTS

| | | | |
|---|---|---|---|
| 5,055,263 | A | 10/1991 | Meltzer |
| 5,133,373 | A | 7/1992 | Hoffman et al. |
| 5,141,871 | A | 8/1992 | Kureshy et al. |
| 5,306,510 | A | 4/1994 | Meltzer |
| 5,408,891 | A | 4/1995 | Barber et al. |
| 5,411,065 | A | 5/1995 | Meador et al. |
| 5,474,744 | A | 12/1995 | Lerch |
| 5,525,515 | A | 6/1996 | Blattner |
| 5,603,342 | A | 2/1997 | Shambaugh |
| 5,700,637 | A | 12/1997 | Southern |
| 5,770,151 | A | 6/1998 | Roach et al. |
| 5,807,522 | A | 9/1998 | Brown et al. |
| 5,827,744 | A | 10/1998 | Fose et al. |
| 5,843,378 | A | 12/1998 | El-Hage et al. |
| 5,847,105 | A | 12/1998 | Baldeschwieler et al. |
| 5,895,915 | A | 4/1999 | DeWeerd et al. |
| 5,897,837 | A | 4/1999 | Mizuno |
| 5,922,617 | A | 7/1999 | Wang et al. |
| 5,927,547 | A | 7/1999 | Papen et al. |
| 5,935,859 | A | 8/1999 | Elliott et al. |
| 5,957,167 | A | 9/1999 | Feygin |
| 6,015,880 | A | 1/2000 | Baldeschwieler et al. |
| 6,017,496 | A | 1/2000 | Nova et al. |
| 6,024,925 | A | 2/2000 | Little et al. |
| 6,039,211 | A | 3/2000 | Slater et al. |
| 6,083,763 | A | 7/2000 | Balch |
| 6,101,946 | A | 8/2000 | Martinsky |
| 6,131,512 | A | 10/2000 | Verlinden et al. |
| 6,212,949 | B1 | 4/2001 | Inder et al. |
| 6,235,473 | B1 | 5/2001 | Friedman et al. |
| 6,878,554 | B1 | 4/2005 | Schermer et al. |

FOREIGN PATENT DOCUMENTS

| | | |
|---|---|---|
| GB | 2 310 006 | 8/1997 |
| WO | WO-99/22867 | 5/1999 |
| WO | WO-99/34931 | 7/1999 |
| WO | WO-99/36760 | 7/1999 |
| WO | WO-99/42804 | 8/1999 |
| WO | WO-00/01798 | 1/2000 |
| WO | WO-00/13796 | 3/2000 |
| WO | WO-00/51058 | 8/2000 |
| WO | WO-00/63705 | 10/2000 |
| WO | WO-01/58593 | 8/2001 |

OTHER PUBLICATIONS

Website (www.biorobotics.co.uk) literature of BioRobotoics, Inc. showing specifications of MicroGrid printed Jan. 14, 2000.

Website (www.cartesiantech.com) literature of Cartesian Technologies showing specification of PinArray, nQUAD, CloneTracker and PegaSys printed in Jan. 14, 2000.

Website (www.genemachines.com) literature of GeneMachines showing specifications of OmniGrid printed Jan. 14, 2000.

Website (www.geneticmicro.com) literature of Genetic MicroSystems, Inc. showing specifications of GMS Microarray Analysis System printed Jan. 14, 2000.

Website (www.genetix.co.uk) literature of Genetix Limited showing specifications of Q Array MicroArrayer printed Jan. 14, 2000.

Website (www.genpakdna.com) literature on GenPak, Inc. showing specification of genpak Array 21 Robotic Micro-Arrayer System printed on Jan. 14, 2000.

Website (www.genomicsolutions.com) literature of Genomic Solutions, Inc. showing specifications of Flexys printed on Jan. 14, 2000.

Website (www.esit.com) literature of Engineering Services Inc. showing specifications of SDDC printed on Jan. 14, 2000.

Website (www.packardinst.com) literature of Packard Instrument Company showing specifications of The Bio-Chip Arrayer printed on Jan. 17, 2000.

Website (www.arrayit.com) literature of TeleChem International, Inc. showing specifications of ArrayIt printed on Jan. 14, 2000.

Website (www.majerprecision.com) literature of Majer Precision Engineering showing specifications of MicroQuill printed on Jan. 14, 2000.

Website (www.coming.com) literature of Corning Incorporated showing specifications of Corning Microarray Technology (CMT) printed on Jan. 27, 2000.

Website (http://nunc.nalgenunc.com) literature of Nalge Nunc International showing specification of MicroWell Plates printed Jan. 27, 2000.

Website (www.keyence.com) literature of Keyence Corporation of America showing specifications of CCD Bar Code Readers.

Genetic MicroSystems Product Literature of GMS Microarray Analysis System.

Website (www.intelligentbio.com) literature of Intelligent-Bio Instruments showing specifications of HT Production Microarrayer printed on Apr. 14, 2000.

Website (www.labman.co.uk) literature of Labman Automation Limited showing specifications of Microarray Spotter systems printed on Apr. 14, 2000.

Anonymous, "Wire Printer Diagnostic Method" IBM Technical Disclosure Bulletin, vol. 27, No. 9, p. 5042 (1985).

"Patent Abstracts of Japan" vol. 007, No. 196, Aug. 28, 1983.

Derisi et al. "The Mguide, a Complete Guide to Building Your Own Microarrayer" Biochemistry Department of Stanford University, pp. 19-20 (1999).

Rose, "Application of a Novel Microarraying System in Genomics Research and Drug Discovery" Journal of the Association for Laboratory Automation, vol. 3, No. 3, pp. 53-56 (1998).

METHOD AND APPARATUS FOR AUTOMATIC PIN DETECTION IN MICROARRAY SPOTTING INSTRUMENTS

RELATED APPLICATION

This application is a continuation of U.S. application Ser. No. 09/527,892, filed Mar. 20, 2000 now U.S. Pat. No. 6,878,554, the entirety of which is incorporated herein by reference.

FIELD OF THE INVENTION

The present invention relates generally to microarray spotting instruments and, more particularly, to a method and apparatus for detecting the presence of pins at particular locations in a printhead of such instruments.

DESCRIPTION OF RELATED ART

As is well known (and described, e.g., in U.S. Pat. No. 5,807,522 issued to Brown et al. and in "DNA Microarrays: A Practical Approach," Schena, Mark, New York, Oxford University Press, 1999, ISBN 0-19-963776-8), microarrays are arrays of very small samples of purified DNA or protein target material arranged as a grid of hundreds or thousands of small spots on a solid substrate. When the microarray is exposed to selected probe material, the probe material selectively binds to the target spots only where complementary bonding sites occur, through a process called hybridization. Subsequent quantitative scanning in a fluorescent microarray scanner may be used to produce a pixel map of fluorescent intensities (See, e.g., U.S. Pat. No. 5,895,915 issued to DeWeerd et al.). This fluorescent intensity map can then be analyzed by special purpose quantitation algorithms, which reveal the relative concentrations of the fluorescent probes and hence the level of gene expression, protein concentration, etc., present in the cells from which the probe samples were extracted.

The microarray substrate is generally made of glass that has been treated chemically to provide for molecular attachment of the spot samples of microarray target material. The microarray substrate is generally of the same size and shape as a standard microscope slide, about 25 mm×75 mm×1 mm thick. The array area can extend to within about 1.5 mm of the edges of the substrate, or can be smaller. The spots of target material (typically DNA) are approximately round. The spot diameter usually varies from about 75 microns to about 500 microns, depending on the dispensing or spotting technique used. The center-to-center spacing between the spots usually falls into the range of 1.5 to 2.5 spot diameters.

Figure 1A:
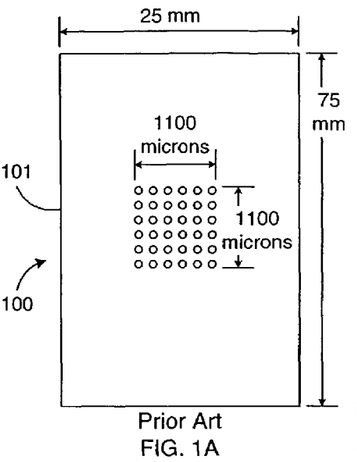
FIG. 1A is a top view of a prior art microarray.

FIG. 1A, which is not drawn to scale, is a top view of a prior art microarray 100. In this drawing, each of the circles represents a tiny spot of target material that has been deposited onto a rectangular glass substrate 101. The spots are shown magnified relative to the substrate 101. For convenience of illustration, only a few spots (a six by six array) are shown covering a small area of the substrate. However, thousands of spots are usually deposited in a typical microarray, and the spots may cover nearly the entire substrate.

There are several well known methods of depositing the spots onto the substrate of a microarray, and instruments that deposit the spots are typically referred to as "spotting instruments." One such instrument works similarly to an ink-jet printer, where a few microliters of sample are aspirated by vacuum out of a sample reservoir into a hollow tube or needle. One or more droplets of the sample are then ejected from a nozzle end of the tube onto the substrate to form a spot.

Other spotting instruments use pins as spot dispensers. This method of spotting generally comprises (1) dipping a pin into the liquid sample in a sample reservoir where some amount is taken up by capillary action or surface tension, (2) moving the pin to a predetermined location above a microarray substrate (typically using a robotic arm), and (3) lowering the pin until its tip makes contact with the substrate. Some of the sample material is transferred to the substrate by either inertia or surface tension to form a microarray spot.

Figures 1B, 1C, 1D, 1E, 1H:
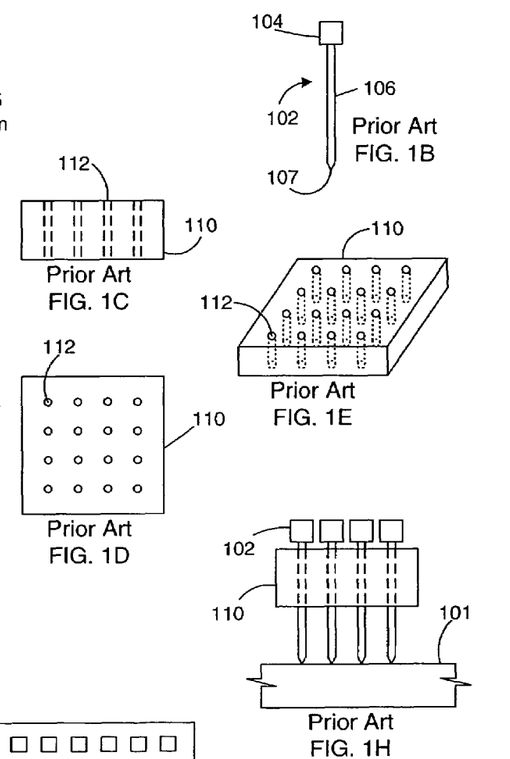
FIG. 1B is a side view of a prior art pin.
FIGS. 1C, 1D, and 1E are side, top, and perspective views, respectively, of a prior art printhead.
FIG. 1H is a side view of the printhead shown in FIGS. 1F and 1G shown being lowered onto a substrate to bring the pins mounted in the printhead into contact with the substrate to form spots of a microarray.

Pins are commercially available in several distinct forms. The simplest pins are solid. FIG. 1B shows an example of such a prior art solid pin 102, which includes a pinhead 104 and a shaft 106. Both the pinhead 104 and the shaft 106 are generally cylindrical and coaxially arranged. The diameter of the shaft 106, which is about 1 mm, is less than the diameter of the pinhead 104. One end or tip 107 of the shaft 106 is tapered or sharpened, and the other end is attached to or integral with the pinhead 104. The tip typically includes a small flat, and the area of the flat (along with the surface properties of the sample liquid and the microarray substrate) determine the size of the spot that the pin will form. Solid pins are simple and robust, but in being dipped into the target material in a well typically only take up enough material to form one spot. This then requires the spotting instrument to dip the pin once for every microarray spot that is to be printed.

Other types of known pins can hold enough target material from a sample reservoir to form several, perhaps even hundreds, of spots before they need to be re-dipped in the reservoir. One such type of pin (not shown) is formed from a hollow cylindrical tube with an axial slot cut in the tip (See, e.g., U.S. Pat. No. 5,770,151 issued to Roach et al.). This pin draws up sample liquid into the tube and slot by capillary action, and deposits it in small amounts onto the substrate by capillary action upon contact with the microarray substrate. The uptake volume of the pin is sufficient to form dozens of spots by subsequent contact with other microarray substrates in the batch being processed.

Another type of multi-spot dispensing pin is a solid "two-piece" pin (not shown), which has a gap or slot at the shaft tip. This type of pin draws fluid into the gap or slot by capillary action, and deposits a small amount onto the substrate by the inertia of the fluid when the pin is rapidly decelerated by lightly tapping it on the substrate. Again, the amount dispensed to form a spot is small compared to the sample uptake volume, so that each dip of the pin into sample liquid takes up enough sample material to form dozens of spots.

Yet another type of multi-spot dispensing pin available, e.g., from TeleChem International, Inc., is similar in appearance to the two-piece pin, but operates somewhat differently. These pins are solid, with a pyramidal taper at the tip that ends in a small square flat. A small slot is cut across the tip, providing a reservoir for holding sample liquid. The tip of the pin is then squeezed or bent slightly to bring the two segments of the slotted tip closer together. In use, these slotted pins are dipped into sample liquid, where a small quantity (e.g., a fraction of a microliter) of sample is taken up into the slot by capillary action. The specific geometry and material of the pin also causes a very small amount of liquid in the slot to wick out onto the two segments of the split pin tip. Then, the pin is brought into contact with the microarray substrate where capillary action attracts the portion of sample that is on the pin tip and forms a spot.

Each type of pin must be manufactured to very precise tolerances to insure that each spot formed by the pin will be of controlled size. As a result of these demanding specifications, the pins are expensive (e.g., a single pin typically costs several hundred dollars). Also, the pins are very fragile given that the pin tips are so small and precisely shaped. Consequently, to avoid damage, the tips can only be subjected to a very small force when they are placed in contact with the substrate or any other solid object.

Spotting instruments typically form microarrays in batches. For example, in a single "run", a spotting instrument may form up to 100 identical microarrays. After forming enough spots to complete the batch of microarrays being spotted, the pins generally need to be washed (to remove any excess liquid target material), and then dried before they can be dipped into another reservoir of target material. So the process of forming microarrays with a "pin-type" spotting instrument includes steps of (1) positioning a pin over a reservoir of target material; (2) dipping the sharp end of the pin into the reservoir; (3) withdrawing the sharp end of the pin from the reservoir; (4) moving the pin over a selected location within the active area of a microarray; (5) lowering the pin to bring the sharp end of the pin into contact with the microarray substrate to form a single spot of controlled size at the selected location; (6) repeating steps (4) and (5) until the pin's supply of target material is exhausted or until the desired number of spots have been placed on the batch of microarrays being produced; (7) raising the pin to separate the sharp end of the pin from the substrate; (8) washing the pin by either placing the pin in a stream of cleaning solution or by dipping the pin into a reservoir of cleaning solution; and (9) drying the pin. The spotting instrument repeats all of these steps numerous times to form a single microarray.

Figure 1F:
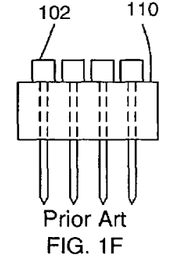
FIGS. 1F and 1G are side and top views, respectively, of the printhead shown in FIGS. 1C, 1D, and 1E with sixteen pins mounted therein.
Figure 1G:
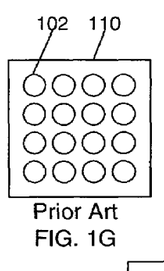

Since microarrays typically include thousands of spots, using only a single pin to form the microarray would be extremely time consuming. Accordingly, spotting instruments are typically designed to simultaneously manipulate several pins. FIGS. 1C, 1D, and 1E show side, top, and perspective views, respectively, of a simplified printhead 110 that can simultaneously hold up to sixteen pins 102. Printhead 110 is a block of material, typically metal, that includes an array of sixteen through-holes or apertures 112. The apertures 112 are slightly larger than the outer diameter of the pin shafts 106 so the shafts can extend through the apertures 112. The apertures 112 are also smaller than the outer diameter of the pinheads 104 so that when the pin shaft is dropped into one of the apertures 112, the pinhead 104 will be supported by the upper surface of the printhead 110. The pins are thereby "slip-fit" into the apertures of the printhead. FIGS. 1F and 1G show side and top views, respectively, of the printhead with sixteen pins mounted therein.

FIG. 1H illustrates printhead 110 being lowered to place the tips of the pins 102 into contact with substrate 101 and thereby simultaneously forming sixteen spots of target material on the substrate. As shown, the printhead is generally lowered about 1 mm further than needed to place the tips of the pins in contact with the substrate 101. The slip-fit allows the upper surface of the printhead to be lowered beneath the bottom of the pin heads without imparting any significant force to the tips of the pins. The printhead is preferably lowered sufficiently slowly so that the force applied to the tips of the pins (1) is principally determined by the weight of the pin plus a minor additional force due to the friction of the slip-fit and (2) is not significantly affected by inertial forces. The act of lowering the printhead to place the tips of the pins in contact with the substrate and thereby forming spots on the microarray is commonly referred to as "printing."

Pins sometimes get stuck in an 'up' or raised position in the printhead, i.e., the position shown in FIG. 1H. Pins generally weigh 0.4-1.0 grams and rely on gravity to pull them down so that the pin head rests on the top surface of the printhead when the printhead is lifted (as shown in FIG. 1F). Friction resulting from, e.g., dirt or finger oil on the pin shaft or a slightly bent shaft, can prevent the pin from properly falling down to its rest position. If a pin gets stuck in the up position, it is not useful for printing. A need thus exists for a method and apparatus for quickly and accurately determining whether there are any pins in the printhead that are stuck in an up position.

Figure 1I:
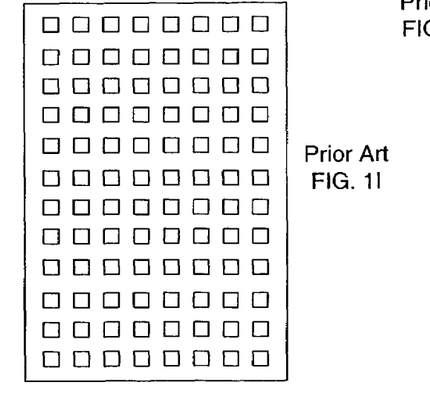
FIG. 1I is a top view of a prior art 96-well plate.

Commercially available printheads provide between 4 and 72 apertures, thereby accommodating between 4 and 72 pins. Commercially available reservoirs provide a plurality of wells, or individual reservoirs, and permit each pin mounted in a printhead to be dipped into a separate well. Two popular reservoirs useful for producing microarrays are the "96-well plate" and the "384-well plate." Each of these plates provides a rectangular array of wells, each well being capable of holding a unique sample of liquid target material. FIG. 1I shows a top view of a 96-well plate. In 96-well plates, the centers of the individual reservoirs are separated by 9.0 mm, and in 384-well plates, the centers of the individual reservoirs are separated by 4.5 mm. The centers of adjacent apertures in commercially available printheads are correspondingly separated by either 9.0 or 4.5 mm. Pin-type spotting instruments generally include mechanisms for holding or manipulating one or more plates (e.g., either 96-well or 384-well), a printhead, a robotic manipulator for controlling the movement of the printhead, mechanisms for holding a plurality of substrates, a pin washer, and a dryer.

In many spotting instruments, the printhead is readily accessible to the user, and the user configures the printhead with the number and arrangement of pins as desired. Often, a printhead that can accommodate 32 or more pins is populated with only 4, 8, or 16 pins. The printhead may not be fully populated for several reasons. First, the user might desire a compact pattern of spots in the finished microarray. For instance, an array made with a fully populated 48-pin printhead would probably be 18 mm×54 mm in extent. That size of an array is large enough to require a large amount of fluorescent probe material to cover it, and to require special care to ensure that the hybridization reaction of the probe is uniform. Second, the pin spacing in the printhead might not correspond to the well spacing in the well plates. For example, 96-well plates have wells on 9.0 mm centers, and 384-well plates have wells on 4.5 mm centers. If a printhead with 4.5 mm pin spacing is used with a 96-well plate for spotting, then only every fourth hole in the printhead can be populated with a pin, or else all the pins will not be aligned with wells in the plate. Third, the user might not have enough pins available to fill a printhead. Pins can easily be damaged, and are expensive. Many users do not invest in a complete set of pins while they are initially qualifying their microarray process, and/or may not immediately replace a damaged pin.

Spotting instruments include robotic manipulator arms that are driven through a series of repetitive motions by one or more computer controllers. The printhead and/or microarray sample plates and/or microarray substrates are moved by robotic arms relative to one another in three dimensions (i.e., X, Y and Z axes). As previously mentioned, a spotting cycle includes sample uptake (dipping pins in particular wells of a particular plate), spotting (depositing spots of the sample in particular locations on one or more microarray substrates), then washing and drying the pins on the printhead. Each subsequent printing cycle is performed with the printhead's pin positions indexed to dip into the next series of wells on the plate (or on the next plate) and to print on the next spot positions on a substrate. The instrument's controller keeps track of and controls the indexing of positions of the sample uptake and printing motions for each cycle.

In commercially available pin-type spotter instruments, for a controller to perform these positioning tasks, the parameters of which printhead positions are occupied by pins must be known and entered into the controlling program. In known spotting instruments, this information is manually entered by the user, either as alphanumerical information or using a graphical user interface display. If the user mistakenly enters incorrect pin location information, spotting errors and even damage to the pins can occur. Pin location can usually be readily determined by visual inspection when the printhead is small and with few pins. However, with a printhead having a capacity of 32 pins or greater and dozens of pins, it is tedious and error prone to determine pin positions and enter them manually into the controlling computer. A need thus exists for a method and apparatus for quickly and accurately determining pin positions in pin-type spotter instruments.

BRIEF SUMMARY OF THE INVENTION

A method and apparatus are provided for automatically sensing the presence (or absence) of spot dispensers such as pins in various possible mounting locations in the printhead of a microarray spotting instrument. Pin-location data obtained by the method and apparatus is provided to the computer controller of the instrument, which uses the data to control the motion of the printhead during operation of the instrument. A pin detection apparatus in accordance with the invention includes one or more sensor elements that automatically sense possible pin locations in the printhead for the presence of pins. The sensor elements are preferably arranged in an array corresponding to the array of pin locations in the printhead so that pin detection at each pin location can be performed simultaneously. The pin detection apparatus also preferably detects whether there are any pins stuck in an 'up' position during a printing operation.

Various types of sensor elements can be used to locate pins in a printhead in accordance with the invention. For example, sensors can be used that are remote from or attached to a printhead. Pin sensors can be used that sense pin locations from various positions relative to the printhead including above or below the printhead. Also, pin sensing in accordance with the invention can be by contact or non-contact mechanisms.

The inventive method and apparatus allow pin positions in a printhead to be quickly and accurately determined, and without significant risk of damaging the pins, which are fragile.

These and other features and advantages of the present invention will become readily apparent from the following detailed description wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a fuller understanding of the nature and objects of the present invention, reference should be made to the following detailed description taken in connection with the accompanying drawings wherein.

Like reference numerals denote like parts in the drawings.

DETAILED DESCRIPTION OF PREFERRED EMBODIMENTS

The present invention is generally directed to a method and apparatus for automatically sensing the presence (or absence) of spot dispensers such as pins in various possible mounting locations in the printhead of a microarray spotting instrument. Pin-location data obtained by the method and apparatus is provided to the computer controller of the instrument, which uses the data to control the motion of the printhead during operation of the instrument. More specifically, the controller utilizes the pin location data to determine the proper positioning coordinates for the printhead in subsequent sample uptake and microarray spot printing operations for one or more of microarrays being printed. Pin sensors can also report an error condition to a user.

Pin location sensing in accordance with the invention can be performed as needed at any time during use of the instrument. However, the inventive system is particularly useful for automating the initialization process of microarray spotting instrument operation on a batch of microarrays. Pin location will ordinarily need only to be determined at the beginning of a printing operation on a batch of microarrays since pin configuration in a printhead is not expected to change during printing of the batch.

The inventive pin sensing method and apparatus can also preferably be used for detecting whether there are any pins that are stuck in an up or raised position (i.e., pins that remain raised relative to the printhead when the printhead is lifted away from a substrate during a printing operation). If any pins are determined to be stuck in an up position, operation of the spotting instrument can be stopped and/or the instrument operator can be alerted. Also, as will be discussed below, if a pin is found to be stuck in an up position, the spotting instrument can automatically reconfigure the instrument control sequence to avoid using the stuck pin using a pin lifter mechanism.

Figure 2:
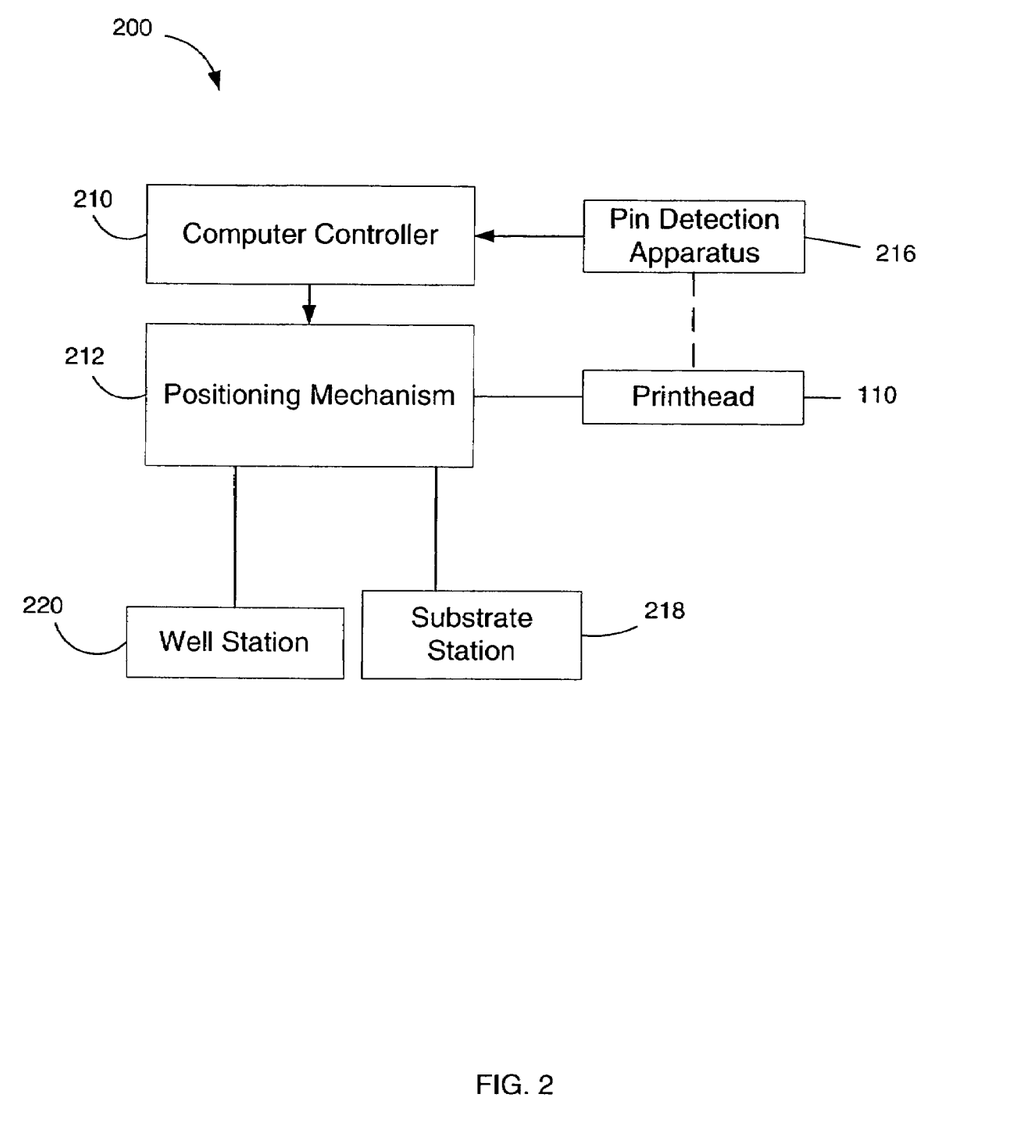
FIG. 2 is a simplified block diagram of a spotting instrument in accordance with the invention.

FIG. 2 is a simplified block diagram of a spotting instrument 200 in accordance with the invention. The instrument 200 includes a computer controller 210 (e.g., a microprocessor controller), a printhead 110, a printhead positioning mechanism 212 (e.g., one or more robotic manipulator arms), a pin detection apparatus 216, a substrate station 218 for holding one or more substrates of a microarray, and a well station 220 for holding one or more reservoirs of liquid target material (e.g., a 96-well plate). The robotic manipulator arms 212 move the printhead 110 (and the apparatus 216 if it is attached to the printhead as will be described below) to locations selected by the controller 210. (While the positioning mechanism normally moves the printhead relative to microarray substrates and well plates, it should be realized that the printhead could be kept stationary and the substrates and well plates be moved relative to the printhead. Alternatively, the printhead, substrates and well plates could all be movable.)

Figure 3A:
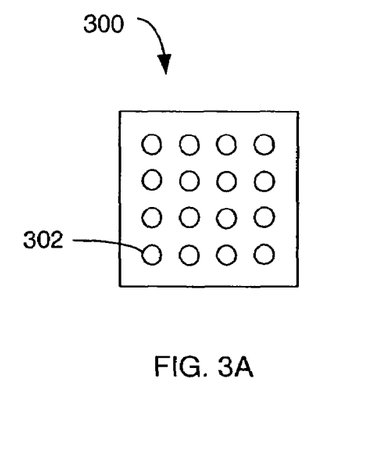
FIG. 3A is a bottom view of a pin detection apparatus in accordance with one embodiment of the invention.
Figure 3B:
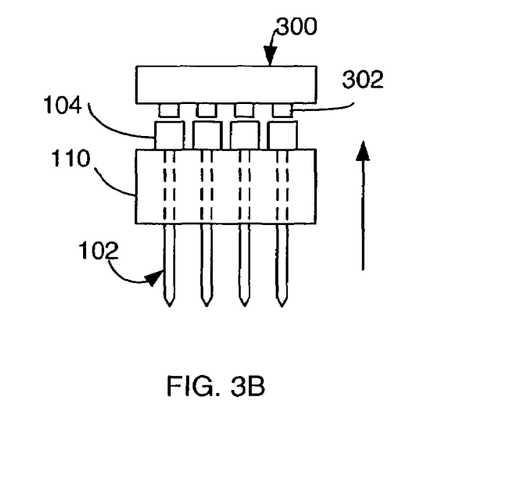
FIG. 3B is a side view of the FIG. 3A pin detection apparatus shown in use detecting the presence of pins in a printhead.

FIGS. 3A and 3B illustrate bottom and side views, respectively, of a pin detection apparatus 300 in accordance with one embodiment of the invention. The apparatus 300 comprises a sensing plate having a plurality of individual sensing elements, namely electrical contacts 302. The sensing plate can comprise, e.g., a printed circuit board (PCB) structure. The electrical contacts 302 are arranged in an array corresponding to the array of possible pin locations in a printhead. (For example, as shown, the sensing plate can have 16 contacts arranged to correspond to the 16 pin apertures in a 16-pin printhead.) In use as shown in FIG. 3B, the positioning mechanism (i.e., a robotic manipulator arm 212) is used to align the printhead 110 below the sensing plate such the contacts in the plate are each aligned with a corresponding pin aperture in the printhead 110. Then, the top of the printhead 110 is moved toward the sensing plate with an upward (i.e., Z-axis) motion of the positioning mechanism to bring the pinheads 104 of pins 102 in the printhead 110 into contact with the contacts 302 in the sensing plate.

As previously mentioned, printheads and pins typically comprise a conductive material such as metal. The presence of pins in each pin aperture in the printhead can accordingly be electrically sensed. In accordance with the invention, voltage is applied to the print head (and thereby to the pins, which are in contact with the printhead). The contacts in the sensing plate are grounded. (Alternatively, the printhead is grounded and voltage is applied to the sensing plate contacts.) Electrical conduction is sensed at each contact individually to determine whether a pin is present in the corresponding pin location. A signal indicative of whether conduction is sensed at each contact is generated and transmitted to the controller 210.

The voltage source preferably applies alternating current (AC) to the printhead (or alternatively to the sensing plate contacts). AC is preferred since it is likely to provide better results than direct current (DC) as some percentage of it can be capacitively coupled, which may be needed if there is poor electrical contact between the contact and the pin from, e.g., oxidation of the parts. AC at a frequency of 1-100 kHz and a voltage of 5-10 volts peak-to-peak is preferably provided to improve conduction through oxidation.

The contacts in the sensing plate are configured to provide reliable electric contact with the pinheads. The contacts are preferably compliant to provide satisfactory contact across entire array of pins, as the heights of the pin heads might not be held within tight enough tolerance or may be slightly recessed. The contacts can, e.g., comprise spring pins, conductive rubber pads, or some type of elastomer such as that used in LCD applications.

One advantage of the sensor apparatus 300 is that it senses the presence or absence of pins 102 without contacting the fragile pin tips 107. Therefore, sensor apparatus 300 can operate without risking damage to the pins. Since the pinheads 104 are relatively rugged, significant force can be applied by the sensor elements to the pinheads.

Figure 4A:
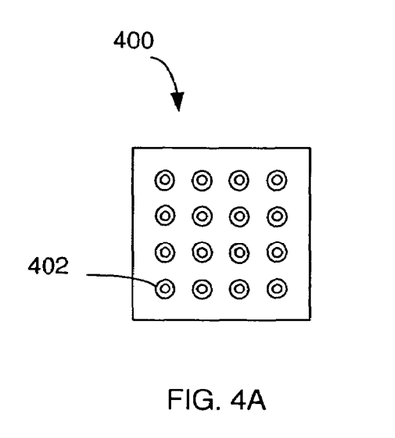
FIG. 4A is a top view of a pin detection apparatus in accordance with another embodiment of the invention.
Figure 4B:
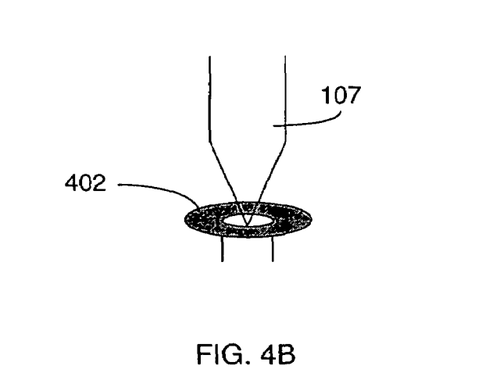
FIG. 4B is an enlarged perspective view of a sensor element of the FIG. 4A apparatus.

FIGS. 4A and 4B illustrate an alternative pin sensing apparatus 400 in accordance with another embodiment of the invention. FIG. 4A is a top view of the apparatus 400. Like the apparatus 300, the apparatus 400 comprises a sensing plate having a plurality of contacts 402 in, e.g., a PCB structure. The contacts are arranged in an array corresponding to pin aperture locations in a printhead. The apparatus 400 is intended to sense the presence of pins 102 in the printhead through contact with the tips 107 of pins.

FIG. 4B is an enlarged view of a pin tip 107 engaging a contact 402 in the sensing plate. As shown, the contact preferably comprises an annular sensing area formed, e.g., as a PCB type probe hole.

In use, the positioning mechanism (i.e., robotic manipulator arm 212) is used to align the printhead 110 above the sensing plate such the contacts in the plate are each aligned with a corresponding pin location in the printhead 110. Then, the printhead 110 is moved toward the sensing plate with an downward motion of the positioning mechanism to bring the tips 107 of the pins 102 in the printhead 110 into contact with the contacts 402 in the sensing plate. As shown in FIG. 4B, the tips 107 are inserted into the holes in the contacts 402.

As with the apparatus 300, voltage is applied to the printhead (and thereby to the pins, which are in contact with the printhead). The contacts in the sensing plate are grounded. (Alternatively, the printhead is grounded and voltage is applied to the sensing plate contacts.) Electrical conduction is sensed at each contact individually to determine whether a pin is present in the corresponding pin location. A signal indicative of whether conduction is sensed at each contact is generated and transmitted to the controller 210.

As with the apparatus 300, AC is preferably used in the voltage source since AC is likely to perform better than DC as some percentage of it can be capacitively coupled, which may be needed if there is poor contact from, e.g., oxidation. AC at a frequency of 1-100 kHz and a voltage of 5-10 volts peak-to-peak is preferably provided to improve conduction through oxidation.

The configuration of the contact 402 as a probe sensing area is advantageous in reducing damage to fragile pin tips since the pin tips are received in holes in the contacts 402.

Figure 5A:
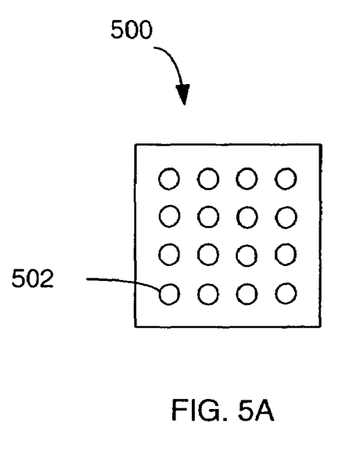
FIG. 5A is a top view of a pin detection apparatus having strain gage units in accordance with another embodiment of the invention.
Figure 5B:
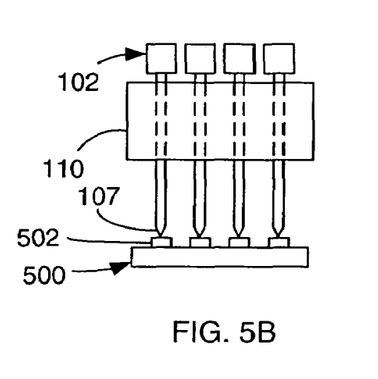
FIG. 5B is a side view of the FIG. 5A pin detection apparatus shown in use detecting the presence of pins in a printhead.

FIGS. 5A and 5B illustrate a pin detection apparatus 500 in accordance with a further alternative embodiment of the invention. The apparatus 500 comprises a sensing plate having a plurality of strain gage units 502 for detecting physical contact with pins in a printhead. As is well known, strain gages include a strain sensitive element such as a metallic wire affixed to a surface. As the surface becomes strained (as a result, e.g., of a weight being applied to the surface), the wire stretches, undergoing a change in electrical resistance that is proportional to the change in strain. Circuitry such as a Wheatstone bridge circuit can be used for measuring the changes in resistance.

The strain gage units 502 are preferably arranged in an array corresponding to the array of possible pin locations in a printhead 110. In operation, the printhead is positioned above and aligned with the sensing plate using the positioning mechanism 212. The printhead is then lowered onto the pin sensing plate 500 such that the tips 107 of pins 102 in the printhead are in contact with and the pins are supported by corresponding strain gage units in the sensing plate 500. Strain will be induced in each strain gage unit in contact with a pin tip from the pin weight. The presence of induced strain in a given strain gage unit will thereby indicate the presence of a pin in a corresponding pin location in the printhead.

Figure 6A:
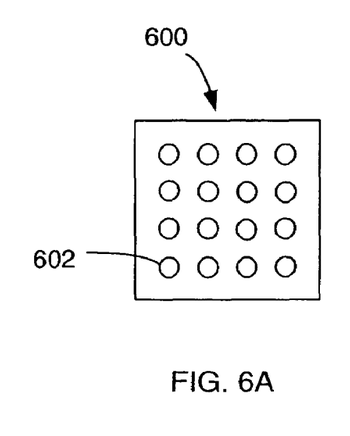
FIG. 6A is a top view of a pin detection apparatus using piezoelectric sensor elements in accordance with another embodiment of the invention.
Figure 6B:
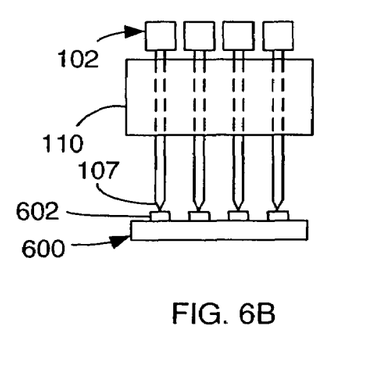
FIG. 6B is a side view of the FIG. 6A pin detection apparatus shown in use detecting the presence of pins in a printhead.

FIGS. 6A and 6B illustrate a pin sensor apparatus 600 in accordance with yet another embodiment of the invention. The apparatus 600 is similar to the apparatus 500 in that it comprises a pin sensing plate having a plurality of sensor elements. However, instead of using an array of strain gage units 502, an array of piezoelectric sensor elements 602 are used for detecting the presence of pins in a printhead. As is well known, piezoelectric materials generate an electrical charge when mechanically strained.

The piezoelectric sensor elements 602 are preferably arranged in an array corresponding to the array of pin locations in a printhead 110. In operation, the printhead 110 is aligned with and lowered onto the pin sensing plate 600, bringing the tips 107 of pins 102 in the printhead 110 into contact with corresponding piezoelectric sensor elements 602 in the sensing plate 600. Electrical charge will be generated in each of the piezoelectric sensor elements 602 in contact with a pin tip 107 from the pin weight. Charge detected in a given piezoelectric sensor element 602 will thereby indicate the presence of a pin 102 in a corresponding pin location in the printhead 110.

Figure 7A:
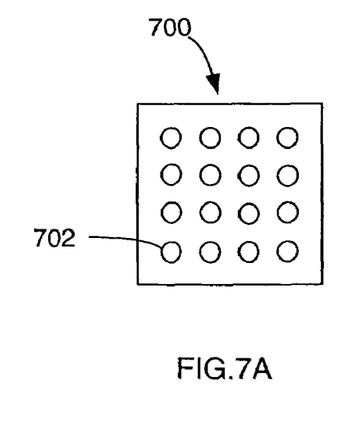
FIG. 7A is a top view of a pin detection apparatus using micro-switch sensor elements in accordance with another embodiment of the invention.
Figure 7B:
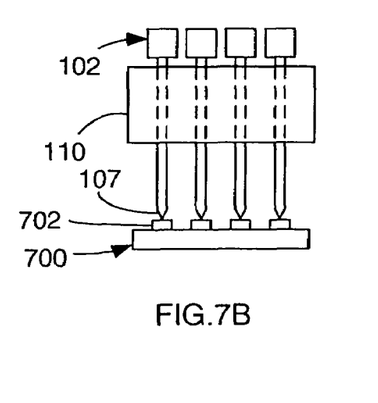
FIG. 7B is a side view of the FIG. 7A pin detection apparatus shown in use detecting the presence of pins in a printhead.

FIGS. 7A and 7B illustrate a pin sensor apparatus 700 in accordance with yet another embodiment of the invention. The pin sensor apparatus 700 comprises a sensing plate having a plurality of low force micro-switches 702 for detecting the presence of pins in a printhead.

The micro-switches 702 are preferably arranged in an array corresponding to the array of pin locations in a printhead 110. In operation, the printhead 110 is aligned with and lowered onto the pin sensing plate 700, bringing the tips 107 of pins 102 in the printhead 110 into contact with corresponding micro-switches 702 in the sensing plate 700. Mechanical contact between a pin tip 107 and a micro-switch 702 will activate the micro-switch (even at low force), which will thereby indicate the presence of a pin in a corresponding pin location in the printhead.

Figure 8A:
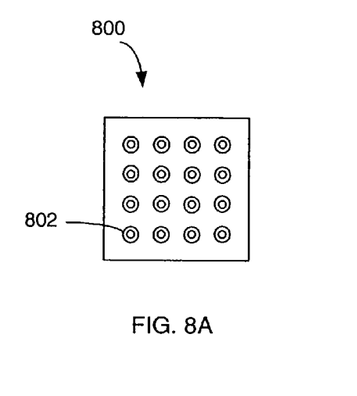
FIG. 8A is a top view of a pin detection apparatus using capacitive sensor elements in accordance with another embodiment of the invention.
Figure 8B:
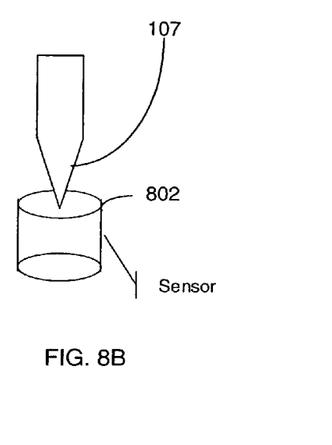
FIGS. 8B and 8C are enlarged perspective views of examples of capacitive sensors usable in the FIG. 8A apparatus.
Figure 8C:
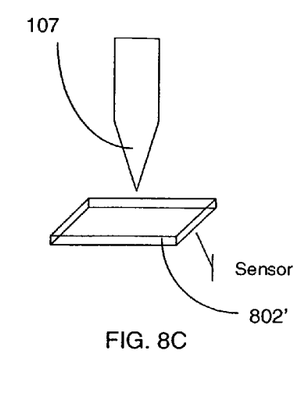

FIGS. 8A-8C illustrate a pin detection apparatus 800 in accordance with yet another embodiment of the invention. The apparatus 800 comprises a sensing plate preferably having a PCB structure and including multiple proximity sensors, preferably capacitive sensors 802, for detecting the presence of pins in a printhead. The capacitive sensors 802 are arranged in an array corresponding to the array of pin locations in a printhead 110. The capacitive sensors 802 are capable of sensing when a pin tip 107 is in proximity with the sensor, even if the pin tip is not in contact with the sensor.

In operation, a high frequency AC signal (e.g., in the range of 1-100 kHz) is applied to the printhead 110. The printhead 110 is moved into alignment with and towards the pin sensing plate 800, bringing the tips 107 of pins 102 in the printhead 110 into proximity with corresponding annular sensors 802 in the sensing plate 800. Each sensor includes an oscillator whose frequency is determined by an inductance-capacitance (LC) circuit connected to the sensor. As the pins 102 in the printhead 110 are moved near respective sensors, the mutual capacitance changes the oscillator frequency. Detection of this change will indicate the presence of a pin in a corresponding pin location in the printhead 110. No change will indicate the absence of a pin.

FIGS. 8B and 8C illustrate examples of different shapes (802 and 802') of sensors. To improve sensor performance, the sensor is configured to improve dielectric coupling by having small capacitive gap widths and/or larger capacitive gap face areas.

Figure 9A:
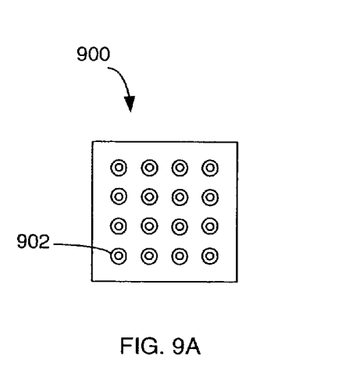
FIG. 9A is a top view of a pin detection apparatus using inductive sensor elements in accordance with another embodiment of the invention.
Figure 9B:
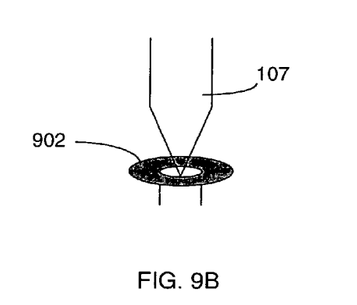
FIG. 9B is an enlarged perspective view of an inductive sensor in the FIG. 9A apparatus.

FIGS. 9A and 9B illustrate a pin sensor apparatus 900 in accordance with yet another embodiment of the invention. The apparatus 900 comprises a sensing plate (preferably of PCB construction) including a plurality of inductive sensors 902 for detecting the presence of pins in a printhead. The inductive sensors are preferably arranged in an array corresponding to the array of pin locations in a printhead 110. The inductive sensors 902 sense the presence of a pin tip preferably without contacting the pin. Each inductive sensor 902 preferably comprises an air-core coil inductor, such as, e.g., a plastic bobbin wound with many turns of magnetic wire or the like. Insertion of the pin 102 in the center of the inductor 902 will significantly increase its inductance, which is sensed as an impedance change in a circuit that passes AC current through the coil.

In operation, the printhead 110 is moved into alignment with and towards the pin sensing plate 900, inserting at least a portion of the tips 107 of pins 102 in the printhead 110 into the center of corresponding inductive sensors 902 in the sensing plate 900. Changes in inductance at an inductive sensor 902 in the sensing plate 900 will indicate the presence of a pin 102 in a corresponding pin location in the printhead 110. No change will indicate the absence of a pin.

Figure 10:
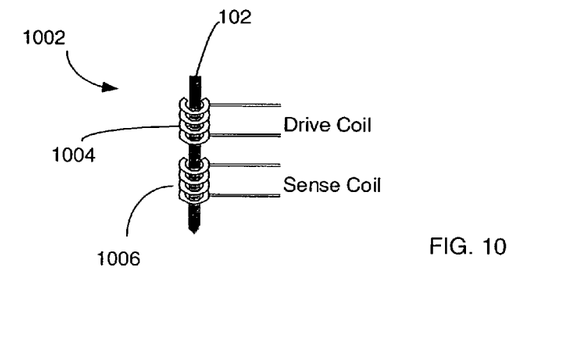
FIG. 10 is an enlarged perspective view of an alternative inductive sensor usable in the FIG. 9A apparatus.

FIG. 10 illustrates an alternative inductive sensor 1002 that can be used in the sensing plate 900 instead of the sensor 902. The sensor 1002 comprises two adjacent (but separate) coils: a driver coil 1004 and a sense coil 1006. An AC current is applied to the driver coil 1004. Without the presence of a pin 102, there would be very little mutual coupling inductance between the coils 1004, 1006, and little AC current would flow through the sense coil 1006. However, if a metal pin 102 from the printhead 110 is inserted through the coils as shown, the coupling greatly increases, measurably increasing the AC current flow in the sense coil 1006. Measured current flow in the sense coil 1006 thereby indicates the presence of a pin 102 in the sensor 1002. No change will indicate the absence of a pin.

The inductive sensors of FIGS. 9B and 10 can be implemented as one-coil or two-coil spiral or spiral-like configurations of the planar conductive traces on a printed circuit board. The two-coil mechanism is preferred with each coil having approximately three turns, with one three turn spiral trace coil on each side of the board. Driving one coil with square waves from a current source at about 10-100 kHz at about 300-400 mA (peak-to-peak) results in robust inductive detection of a pin in the other coil. This mechanism provides robustness without the cost and complexity of attaching and connecting multiple discrete wire coils on bobbins to a circuit board.

Figure 11:
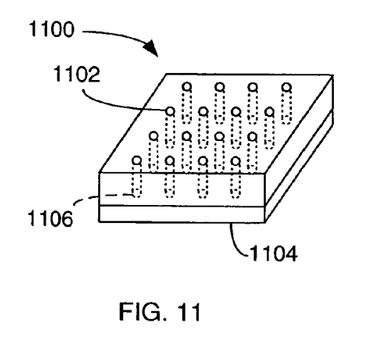
FIG. 11 is a perspective view of a pin detection apparatus using a vacuum mechanism in accordance with another embodiment of the invention.

FIG. 11 illustrates a vacuum sensing apparatus 1100 in accordance with another embodiment of the invention. The apparatus 1100 comprises a sensing plate having a plurality of holes 1102 for receiving tips 107 of pins 102 in a printhead, and a vacuum mechanism 1104 for applying vacuum to the holes 1102. The holes 1102 are arranged in an array corresponding to the array of possible pin locations in the printhead. A pressure transducer 1106 is provided at each hole to detect pressure changes.

In operation, the printhead is moved into alignment with and towards the pin sensing plate 1100, inserting the tips 107 of pins 102 in the printhead 110 into corresponding holes 1102 in the sensing plate 1100. At each hole in which a pin tip has been inserted, the pin at least partially obstructs the ambient airflow into the opening of the hole. Consequently, the vacuum increases (and pressures decreases) in the hole 1102, and that pressure change is sensed by the respective pressure transducer 1104, indicating the presence of a pin 102 in a corresponding pin location in the printhead.

Figure 12:
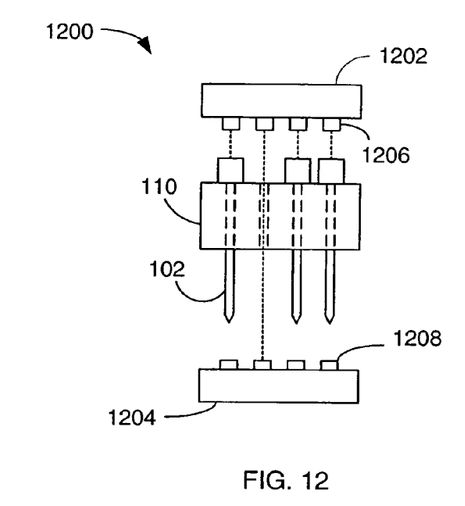
FIG. 12 is a side view of a pin detection apparatus using optical sensing in accordance with another embodiment of the invention.

FIG. 12 illustrates an optical pin sensor apparatus 1200 in accordance with another embodiment of the invention. The apparatus 1200 includes an optical emitter plate 1202 and an optical detector plate 1204. The emitter plate 1202 includes a plurality of optical emitters 1206 such as, e.g., light emitting diodes (LED). The optical emitters 1206 are arranged in an array corresponding to possible pin locations in a printhead 110. The optical detector plate 1204 includes a plurality of optical detectors 1208 (e.g., photodiodes and phototransistors) also arranged in an array such that each optical detector 1208 is aligned with and can receive a light signal from an optical emitter 1206 of the emitter plate 1202.

As shown in FIG. 12, in use, the emitter and receiver plates 1202, 1204 are positioned on opposite sides of a printhead 110 (above and below the printhead) such that corresponding emitters, detectors and pin apertures are aligned. If an aperture is empty (i.e., it does not contain a pin), light from the corresponding emitter 1206 will pass through the printhead 110 and be detected by its corresponding optical detector 1208, which will in response generate a signal indicating light detection. If there is a pin located in the aperture, light from the emitter will not be received by its corresponding optical detector and no signal will be output. In this manner, each aperture in the printhead 110 can be simultaneously examined to detect the presence or absence of a pin.

While it is preferred that the various apparatus described above each include an array of sensor elements to simultaneously sense the presence or absence of pins in all pin locations in the printhead, the apparatus could be provided with one or only a few such sensor elements relative to which the printhead is moved in order to sequentially sense whether a pin is present in each pin location.

Figure 13:
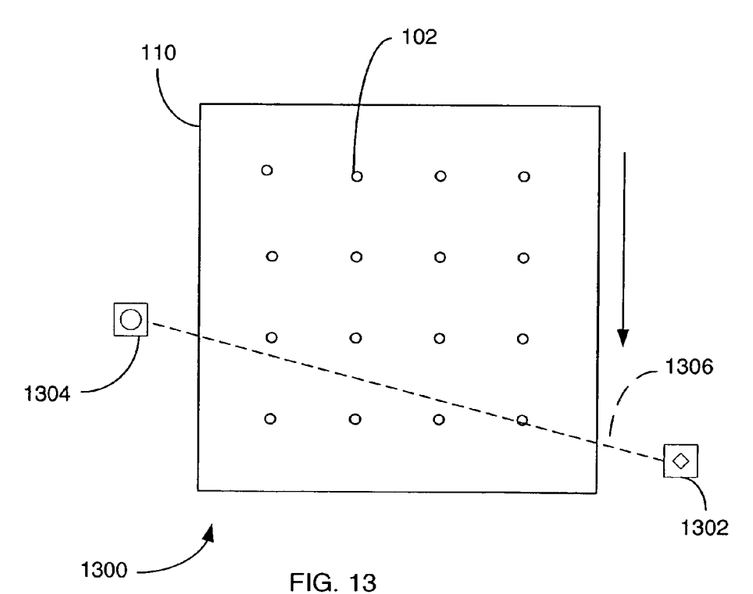
FIG. 13 is a bottom view of a pin detection apparatus using optical sensing in accordance with another embodiment of the invention.

FIG. 13 illustrates an optical sensor apparatus 1300 in accordance with yet another embodiment of the invention. FIG. 13 is a bottom view of the printhead 110, showing an optical emitter 1302 and an optical detector 1304 of the apparatus 1300, horizontally scanning pins in the printhead. The emitter and detector are positioned on opposite sides of the pin array. Light emitted by the emitter and received by the detector will be along a line (i.e., a "line-of-sight") indicated by the dashed line 1306 that is at a predetermined angle relative to the X and Y axis of the printhead in order to allow individual pins to be separately detected. In use, the printhead and/or the emitter/detector pair are moved relative to each other along the X or Y axis. Each pin in the printhead can separately interrupt light between the emitter/detector pair at some predetermined time period during the scanning. Accordingly, each pin location can be separately examined for the presence or absence of a pin.

Figure 14:
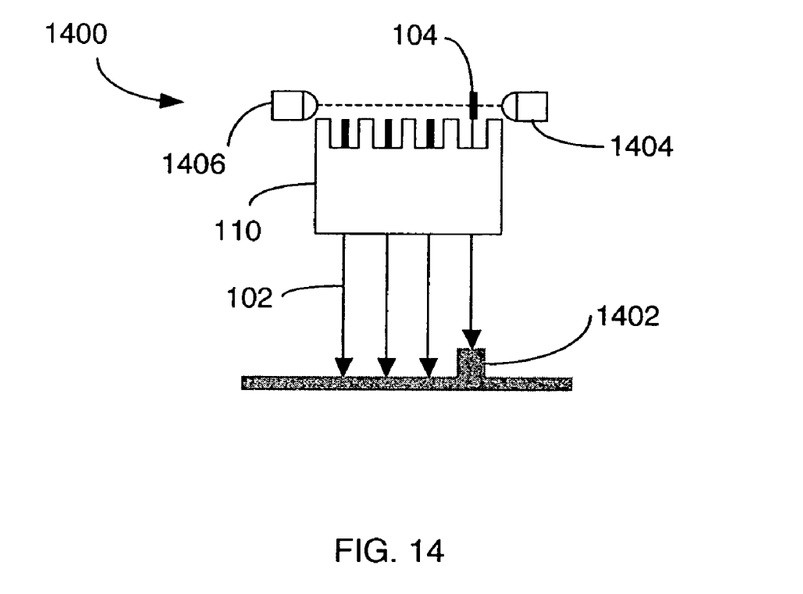
FIG. 14 is a side view of a pin detection apparatus using optical sensing in accordance with another embodiment of the invention.

FIG. 14 illustrates an optical sensor apparatus 1400 in accordance with another embodiment of the invention. The apparatus 1400 examines the pinheads 104 of the pins 102 in a printhead 110 to determine the presence of pins. As shown in the drawing, the spotting instrument is equipped with a test step 1402. The printhead 110 is raised and lowered to sequentially position each pin aperture above the test step 1402. If there is a pin present in the aperture as shown in FIG. 14, the pinhead 104 will be raised relative to the other pins and the printhead 110. The apparatus 1400 includes an optical emitter 1404 and an optical detector 1406 positioned above the printhead, which detect the presence or absence of a pin in the aperture based on whether or not the light signal from the emitter to detector is interrupted.

Although not shown, the apparatus 1400 could be provided with multiple emitter/detector pairs to simultaneously examine an entire row of pins in the printhead. In this case, the test step should be configured to support the entire row. The emitter/detector pairs will transmit and receive optical signals along lines perpendicular to the row of pins being examined.

In accordance with a further alternative embodiment of the invention, a non-optical sensor could be used in place of the optical sensor apparatus 1400 shown in FIG. 14. One such sensor could comprise an air-core coil inductor (similar to that described above with respect to FIGS. 9A and 9B) as an inductive sensor above the printhead. The sensor could be positioned above the printhead and lowered over the pin aperture being examined. If a pin exists in the aperture, the pinhead of the pin will be raised (since the pin will be supported by the test step) and inserted into the core of the air-core coil. The presence of the pinhead in the core would significantly increase the coil's inductance, which could be sensed as an impedance change in a circuit that passes AC current through the coil.

In a further alternative embodiment, other types of inductive sensors could be used in place of the air-core coil sensor. For example, a dual-coil induction sensor of the type described above in FIG. 10 could be used. In addition, sensors other than inductive sensors could be used. For example, a microswitch (similar to that described in FIGS. 7A and 7B above) or a Hall-effect sensor could be used to detect a raised pinhead.

Figure 15:
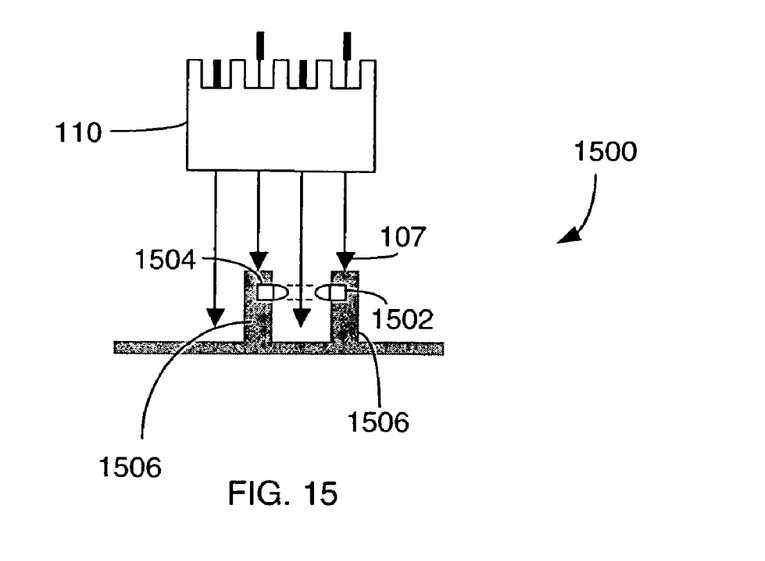
FIG. 15 is a side view of a pin detection apparatus using optical sensing in accordance with another embodiment of the invention.

FIG. 15 illustrates a sensing apparatus 1500 in accordance with yet another embodiment of the invention. This apparatus includes an optical emitter 1502 and an optical detector 1504 positioned to detect a pin tip 107 located between a pair of test steps 1506. Accordingly, the printhead 110 is raised and lowered relative to the test steps 1506 to sequentially position each pin aperture in the printhead 110 at a location above the sensing area (i.e., between the two test steps). If a pin 102 is located in the aperture, the pin tip 107 will interrupt the optical beam or signal from the emitter 1502 to the detector 1504 and thereby be sensed. One advantage of the sensing mechanism 1500 is that no wiring or mechanism is needed on the printhead itself.

Other types of optical sensors can also be used to detect pins in a printhead including, e.g., reflective optical sensors. A reflective optical sensor emits a light signal and detects a reflection of the signal from the object being sensed. Such an optical sensor would be positioned proximate the pin aperture to be sensed. If a pin is located in the aperture, the sensor would receive and detect a reflective optical signal. If no pin were present in the aperture, the sensor would receive no reflective signal. A reflective optical sensor could be used in each of the optical sensing apparatus described above.

Co-pending U.S. patent application Ser. No. 09/523,808 entitled METHOD AND APPARATUS FOR PRODUCING COMPACT MICROARRAYS and filed on even date herewith is incorporated herein by reference. That application describes various pin lifter mechanisms that can be used to produce compact microarrays. Microarray spotting instruments constructed according to the present invention may use those pin lifter mechanisms in conjunction with the sensor apparatus described in the present application to facilitate production of microarrays. For example, if the sensors detect that no pin is mounted within a particular pin aperture in the printhead, then the spotting instrument will know that the pin-lifter for that aperture need not be activated. Sensors could also be used to detect which, if any, pins are mounted within the group of apertures controlled by a pin-lifter. Also, in accordance with the invention, if the pin detection apparatus senses that a pin is stuck in an up (i.e., a raised) position, the spotting instrument can automatically reconfigure the instrument control sequence to avoid using the stuck pins via the pin lifter. The pin lifter preferably has sufficient travel to avoid dipping the pin into the sample, preferably at least 5 mm.

Since certain changes may be made in the above apparatus without departing from the scope of the invention herein involved, it is intended that all matter contained in the above description or shown in the accompanying drawing shall be interpreted in an illustrative and not a limiting sense.

What is claimed:

1. A method of determining the arrangement of fluid dispensing pins in a printhead of a microarray spotting instrument, said printhead having a plurality of pin locations, at least some of which each include a fluid dispensing pin disposed therein, the method comprising:
    automatically detecting whether a fluid dispensing pin is present at each said pin location to determine the arrangement of fluid dispensing pins in said printhead; and
    generating a signal indicating said arrangement of fluid dispensing pins in said printhead.

2. The method of claim 1 wherein automatically detecting whether a fluid dispensing pin is present at each said pin location comprises using a sensor to sense whether a fluid dispensing pin is present in a each pin location.

3. The method of claim 2 wherein said sensor comprises a contact and circuitry for detecting electrical conduction between said contact and said fluid dispensing pin.

4. The method of claim 3 wherein said contact comprises a probe hole in a printed circuit board.

5. The method of claim 3 wherein said contact is compliant.

6. The method of claim 5 wherein said contact is spring-mounted.

7. The method of claim 5 wherein said contact comprises a conductive rubber pad.

8. The method of claim 2 wherein said sensor senses the presence of a pinhead of the fluid dispensing pin.

9. The method of claim 2 wherein said sensor senses the presence of a tip of the fluid dispensing pin.

10. The method of claim 2 wherein said sensor is a strain gage sensor, a piezoelectric sensor, a micro-switch, a capacitive sensor, an optical sensor, or an inductive sensor.

11. The method of claim 2 wherein said sensor is an inductive sensor that includes an air-core coil inductor with a hole for receiving at least a portion of a pin.

12. The method of claim 2 wherein said sensor is an inductive sensor that comprises a pair of spaced apart, but proximate coils each adapted for receiving a portion of a fluid dispensing pin.

13. The method of claim 1 wherein automatically detecting whether a fluid dispensing pin is present at each said pin location comprises using a pin detection apparatus comprising a plate with a hole by applying a vacuum to said hole; positioning said printhead relative to said plate such that if a fluid dispensing pin were located in a given pin location of said printhead, said fluid dispensing pin would be inserted in said hole; and sensing any pressure changes in said hole.

14. The method of claim 1 wherein automatically detecting whether a fluid dispensing pin is present at each said pin location comprises using a pin detection apparatus comprising a surface with a step, and wherein using said apparatus comprises:
    positioning said printhead relative to said step such that a given pin location is positioned above said step and if a fluid dispensing pin were located in said given pin location, said fluid dispensing pin would be supported by said step and a pinhead of said fluid dispensing pin would be raised relative to the printhead; and
    sensing any pinhead raised relative to said printhead.

15. The method of claim 1 wherein automatically detecting whether a fluid dispensing pin is present at each said pin location comprises using a pin detection apparatus having an array of sensor elements corresponding in arrangement to said pin locations in said printhead for simultaneously detecting the presence of a fluid dispensing pin in each pin location.

16. The method of claim 1 wherein said fluid dispensing pins comprise solid pins, split pins, or tubular pins.

17. The method of claim 1 further comprising automatically detecting whether any of said fluid dispensing pins are stuck in a raised position in the printhead.

18. An apparatus used in a microarray spotting instrument for determining which pin locations in a printhead of the microarray spotting instrument are occupied by fluid dispensing pins, comprising at least one sensor element to automatically detect whether a fluid dispensing pin is present in each said pin location for determining the arrangement of a plurality of fluid dispensing pins in said printhead.

19. The apparatus of claim 18 wherein said at least one sensor element comprises a contact and circuitry for detecting electrical conduction between said contact and said fluid dispensing pin.

20. The apparatus of claim 19 wherein said contact comprises a probe hole in a printed circuit board.

21. The apparatus of claim 19 wherein said contact is compliant.

22. The apparatus of claim 19 wherein said contact is spring-mounted.

23. The apparatus of claim 19 wherein said contact comprises a conductive rubber pad.

24. The apparatus of claim 18 wherein said at least one sensor element senses the presence of the pinhead of the fluid dispensing pin.

25. The apparatus of claim 18 wherein said at least one sensor element senses the presence of a tip of the fluid dispensing pin.

26. The apparatus of claim 18 wherein said at least one sensor element comprises a strain gage sensor, a piezoelectric sensor element, a micro-switch, a capacitive sensor, an optical sensor or an inductive sensor.

27. The apparatus of claim 18 wherein said at least one sensor element comprises an inductive sensor having an air-core coil inductor including a hole for receiving at least a portion of a fluid dispensing pin.

28. The apparatus of claim 18 wherein said at least one sensor element comprises an inductive sensor comprising a pair of spaced apart, but proximate coils each adapted for receiving a portion of a fluid dispensing pin.

29. The apparatus of claim 18 wherein said at least one sensor element comprises a vacuum sensor including a plate with a hole, means for applying a vacuum to said hole, and a pressure transducer at said hole for sensing pressure changes at said hole from placing a fluid dispensing pin in said hole.

30. The apparatus of claim 18 wherein said at least one sensor element comprises a surface with a step and a sensor for detecting a raised pinhead of a fluid dispensing pin in the printhead when the printhead is positioned relative to said step such that said fluid dispensing pin is supported by said step.

31. The apparatus of claim 18 wherein said at least one sensor element comprises an array of sensor elements corresponding in arrangement to said fluid dispensing pin locations in said printhead for simultaneously detecting the absence or presence of fluid dispensing pins in each pin location.

32. The apparatus of claim 18 wherein said pins comprise solid pins, split pins, or tubular pins.

33. The apparatus of claim 18 wherein said at least one sensor element also automatically detects whether a fluid dispensing pin is stuck in a raised position in the printhead.

34. A microarray spotting instrument comprising:
   a printhead having a plurality of pin locations;
   a plurality of fluid dispensing pins movably or releasably mounted in at least a subset of the pin locations of the printhead;
   a substrate station for holding at least one microarray substrate;
   a well station for holding sample material to be deposited on said at least one microarray substrate using said printhead;
   a positioning mechanism for moving said printhead;
   a controller for controlling movement of said printhead; and
   a pin detection apparatus comprising at least one sensor element to automatically detect whether a fluid dispensing pin is present in each pin location for automatically determining the arrangement of fluid dispensing pins in said printhead.

35. In a microarray spotting instrument, a method of providing to a controller operating the instrument information on the arrangement of fluid dispensing pins in a printhead in the instrument, comprising:
   providing a printhead having a plurality of pin locations at which fluid dispensing pins are movably or releasably positionable;
   automatically sensing whether a pin is present in each pin location to determine the arrangement of pins in the printhead and generating a signal indicative thereof; and
   transmitting the signal to the controller.

* * * * *